(12) United States Patent
Ko

(10) Patent No.: US 9,437,052 B2
(45) Date of Patent: Sep. 6, 2016

(54) VEHICLE AFTER-SALES SERVICE SYSTEM

(71) Applicant: POWER INTERNATIONAL CHEMICAL & OIL CORPORATION, Tainan (TW)

(72) Inventor: Po-Wen Ko, Tainan (TW)

(73) Assignee: Power International Chemical & Oil Corporation, Tainan (TW)

(*) Notice: Subject to any disclaimer, the term of this patent is extended or adjusted under 35 U.S.C. 154(b) by 0 days.

(21) Appl. No.: 14/480,703

(22) Filed: Sep. 9, 2014

(65) Prior Publication Data

US 2016/0012649 A1 Jan. 14, 2016

(30) Foreign Application Priority Data

Jul. 14, 2014 (TW) .............................. 103124114 A

(51) Int. Cl.
G07C 5/00 (2006.01)
G06Q 10/00 (2012.01)

(52) U.S. Cl.
CPC ............... G07C 5/008 (2013.01); G06Q 10/00 (2013.01)

(58) Field of Classification Search
CPC ..................................................... G07C 5/008
USPC ......................................................... 701/29.1
See application file for complete search history.

(56) References Cited

U.S. PATENT DOCUMENTS

| | | | | |
|---|---|---|---|---|
| 7,502,672 B1* | 3/2009 | Kolls | ..................... | G06Q 30/02 340/988 |
| 8,670,897 B1* | 3/2014 | Ralson | ................ | G06F 11/3013 701/29.1 |
| 8,705,527 B1* | 4/2014 | Addepalli | ............. | H04W 4/046 370/389 |
| 8,751,098 B2* | 6/2014 | Faus | ....................... | G07C 5/008 701/29.1 |
| 8,977,423 B2* | 3/2015 | Merg | ..................... | G07C 5/008 701/31.4 |
| 9,014,910 B2* | 4/2015 | Grau | ..................... | G07C 5/008 701/29.1 |
| 9,053,588 B1* | 6/2015 | Briggs | .................. | G07C 5/006 |
| 2010/0234071 A1* | 9/2010 | Shabtay | ............... | H04B 7/0408 455/562.1 |
| 2011/0227709 A1* | 9/2011 | Story | .................... | B60R 25/102 340/10.42 |
| 2012/0035800 A1* | 2/2012 | Roberts | ................ | G07C 5/0808 701/29.1 |
| 2012/0253587 A1* | 10/2012 | Davidson | ............... | G06Q 10/08 701/29.3 |
| 2013/0151065 A1* | 6/2013 | Ricci | ........................ | G06F 9/54 701/31.4 |
| 2013/0198737 A1* | 8/2013 | Ricci | ...................... | G06F 13/14 717/174 |
| 2013/0204484 A1* | 8/2013 | Ricci | ...................... | G06F 17/00 701/29.4 |
| 2013/0218412 A1* | 8/2013 | Ricci | ...................... | G06F 17/00 701/36 |
| 2013/0219039 A1* | 8/2013 | Ricci | ..................... | G06F 3/0484 709/223 |
| 2013/0282238 A1* | 10/2013 | Ricci | ..................... | G06F 3/0484 701/41 |
| 2013/0317668 A1* | 11/2013 | Tarnutzer | .......... | H04L 12/40006 701/2 |
| 2013/0317693 A1* | 11/2013 | Jefferies | ................. | G07B 15/00 701/31.5 |
| 2014/0098671 A1* | 4/2014 | Raleigh | ................. | H04M 15/80 370/235 |
| 2014/0129047 A1* | 5/2014 | Barrett | ..................... | G07C 5/00 701/1 |
| 2014/0189888 A1* | 7/2014 | Madhok | .............. | H04L 63/0807 726/29 |
| 2014/0208132 A1* | 7/2014 | Cheston | .................... | G06F 1/26 713/310 |
| 2014/0272811 A1* | 9/2014 | Palan | ..................... | G07C 5/008 434/66 |
| 2016/0009179 A1* | 1/2016 | Biderman | ............... | B60L 15/20 701/22 |

* cited by examiner

*Primary Examiner* — Atul Trivedi
(74) *Attorney, Agent, or Firm* — Alan D. Kamrath; Kamrath IP Lawfirm, P.A.

(57) ABSTRACT

A vehicle after-sales service system has a main controller and a cloud platform communicating with the main controller. The main controller is adapted to be equipped on a vehicle and to transmit vehicle information set by an original equipment manufacturer to the cloud platform. The vehicle information can include vehicle body information, chassis information, motive power information, entertainment information and error information. The cloud platform receives and stores the vehicle information from the main controller for providing after-sales service to provide innovative service and to meet the owner's need.

10 Claims, 1 Drawing Sheet

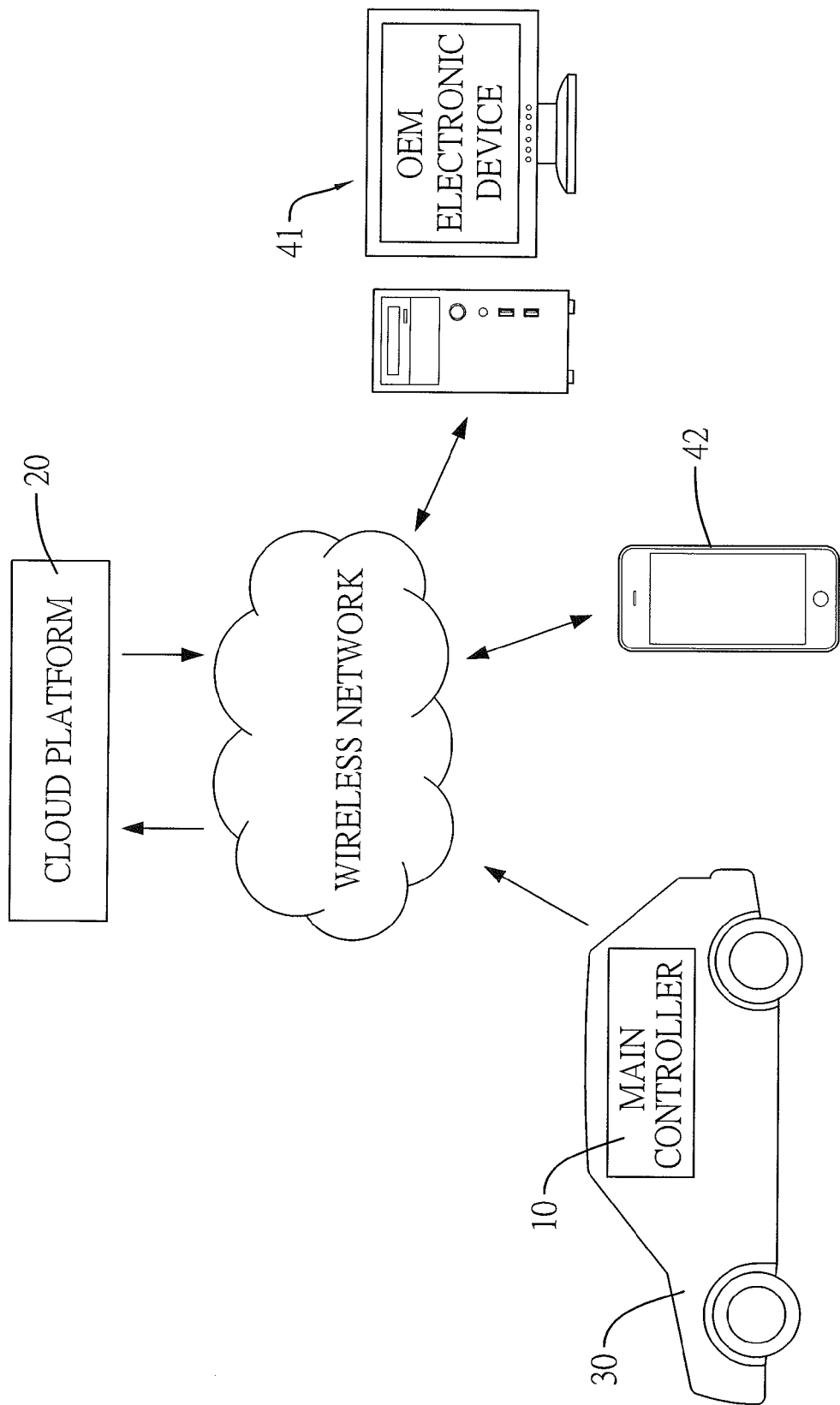

VEHICLE AFTER-SALES SERVICE SYSTEM

CROSS-REFERENCE TO RELATED APPLICATIONS

This application claims the benefit of Taiwan patent application No. 103124114, filed on Jul. 14, 2014, the disclosure of which is incorporated herein in its entirety by reference.

BACKGROUND OF THE INVENTION

1. Field of the Invention

The present invention relates to an after-sales service system and, more particularly, to a vehicle after-sales service system.

2. Description of Related Art

A vehicle, such as a car, is a common means of transportation. As technology advances, electronic products for vehicles are increasingly popular. A car owner can install an audiovisual player, a car stereo, a car video recorder, or a GPS (global positioning system) to the car for providing the car owner and passengers with a user-friendly, comfortable and convenient driving and traveling experience.

The price, the performance, the fuel consumption, the equipment and the after-sales service are factors that would be taken into consideration when a potential vehicle owner is choosing a car for purchase. The price, the performance, the fuel consumption and the equipment are open information for review and comparison with another car. The after-sales service is provided by an original equipment manufacturer of the car. However, different original equipment manufacturers provide similar after-sales service, such as maintenance check service and repair service. The original equipment manufacturer can check and repair the car only when the car is driven back to the original equipment manufacturer, thereby passively serving the vehicle owners upon request. In other words, the original equipment manufacturer cannot timely and accurately provide the after-sales service when the car is not driven to the original equipment manufacturer. As a result, the original equipment manufacturer fails to effectively monitor the car condition. The driving risk is increased. The conventional after-sales service is ineffective.

SUMMARY OF THE INVENTION

Currently, the research and development of vehicles focus mostly on manufacture without taking into consideration how innovative after-sales service can be offered from the aspect of an original equipment manufacturer, and the conventional after-sales service is ineffectively provided, thereby failing to offer an after-sales service that timely and accurately meets the vehicle owner's demand. Hence, an objective of the present invention is to design a system from the concept of the vehicle original equipment manufacturer. The present invention utilizes a main controller installed in the vehicle to communicate with a cloud platform for data transmission. Based on commands of the cloud platform, information received by the main controller is stored in the cloud platform. The information is used to implement after-sales service activities to provide innovative service and meet the owner's need. The cloud platform can combine the innovative service with vehicle repair chain and business activity including food supply chain, residence supply chain and traffic supply chain to provide innovative service. The present invention can improve people's living standard and integrate various supply chains and accomplish the purposes of innovation.

The vehicle after-sales service system of the present invention comprises a main controller and a cloud platform. The main controller is adapted to be equipped on a vehicle and to transmit vehicle information of the vehicle designated by an original equipment manufacturer. The cloud platform communicates with the main controller for data transmission. The cloud platform receives and stores the vehicle information from the main controller for providing to the original equipment manufacturer, such that the original equipment manufacturer determines what after-sales service information should be offered.

According to the system of the present invention, the main controller communicates with a Controller Area Network (CAN) bus system and an On-Board Diagnostics II (OBD-II) system of the vehicle to receive the vehicle information from the CAN bus system and the OBD-II system. The main controller further actively transmits the vehicle information to the cloud platform.

The cloud platform can communicate with an OEM (Original Equipment Manufacturer) electronic device and a vehicle owner's electronic device, such as a personal computer, a laptop, a smart phone, a tablet, and so on. When the vehicle is started, the main controller of the vehicle operates and transmits the vehicle information to the cloud platform. The cloud platform accordingly receives the vehicle information and provides the original equipment manufacturer with the vehicle information. Therefore, the original equipment manufacturer can Monitor the vehicle's condition any time by referring to the vehicle information.

Compared with the conventional after-sales system, the present invention can obtain the vehicle information any time instead of until the vehicle is sent to the original equipment manufacturer. By reviewing the vehicle information provided from the cloud platform, the original equipment manufacturer can determine whether the vehicle needs repair or maintenance, and actively informs the vehicle owner to send the vehicle to the original equipment manufacturer for the inspection and repair service. Therefore, improved after-sales service is provided.

In addition, the original equipment manufacturer can provide the vehicle owner with more data for business activities, and further combine food supply chain, residence supply chain, traffic supply chain and entertainment supply chain to provide innovative service to meet the vehicle owner's need.

BRIEF DESCRIPTION OF THE DRAWINGS

FIG. 1 is a block diagram of the after-sales service system of the present invention.

DETAILED DESCRIPTION OF THE PREFERRED EMBODIMENTS

The present invention can be applied to multiple vehicles. Said vehicle can be, but is not limited to be, a car, a scooter, a truck or a container truck. For conciseness of description, one car is taken as an example. With reference to FIG. 1, the after-sales service system of the present invention comprises a main controller 10 and a cloud platform 20. The main controller 10 is equipped on the vehicle 30 and serves as a central processing unit. The cloud platform 20 can be a network server. The cloud platform 20 and the main controller 10 communicate with each other for data transmission. The communication technique for the main controller 10 and the cloud platform 20 can be third generation wireless networks (3G), fourth generation wireless networks (4G) or higher generation of wireless network technology.

The main controller 10 acquires vehicle information including vehicle body information, chassis information, motive power information, entertainment information and error information from the vehicle 30 and sends the vehicle information to the cloud platform 20. The main controller 10 can have a data determination function. Significantly, the vehicle information sent to the cloud platform 20 is set by an original equipment manufacturer that manufactures the vehicle 30. The cloud platform 20 receives and stores the vehicle information sent from the main controller 10, and provides after-sales service based on the received vehicle information for innovative service that meets the vehicle owner's demands. For instance, the main controller 10 communicates with a Controller Area Network (CAN) bus system and an On-Board Diagnostics II (OBD-II) system of the vehicle 30 to receive the vehicle information via the CAN bus system and the OBD-II system and execute functions including error elimination, data analysis, setting, programming, and so on.

The system of the present invention is designed based on a concept from the original equipment manufacturer to construct the vehicle body information, the chassis information, the motive power information, the entertainment information and the error information of the vehicle 30 in the main controller 10. Furthermore, based on the commands of communication system and the cloud platform 20, the cloud platform 20 stores the required vehicle body information, the chassis information, the motive power information, the entertainment information, food supply chain, residence supply chain, traffic supply chain and the error information and uses them to perform information applications or activities, such as providing repair information or business information for repair service or business activity, to meet the vehicle owner's need.

When the repair service is provided, the cloud platform 20 can communicate with an OEM (Original Equipment Manufacturer) electronic device 41 and a vehicle owner's electronic device 42, such as a personal computer, a laptop, a smart phone, a tablet, and so on. When the main controller 10 of the vehicle 30 works based on the design of the original equipment manufacturer, the main controller 10 operates to transmit the vehicle information according to the design of the original equipment manufacturer. The cloud platform 20 accordingly receives the vehicle information and provides the vehicle information to the OEM electronic device 41. The original equipment manufacturer can determine what kind of after-sales service should be offered based on the received vehicle information. Therefore, the present invention can accomplish the purposes of timely and accurate after-sales service and meeting the vehicle's need by actively providing the vehicle information. The original equipment manufacturer can monitor the vehicle's conditions any time. When the original equipment manufacturer observes unusual events, the original equipment manufacturer can actively inform the vehicle owner that the vehicle should be sent to the original equipment manufacturer for inspection.

Moreover, regarding after-sales service information of business activity, the cloud platform 20 combines food supply chain, residence supply chain, traffic supply chain and entertainment supply chain. Similarly, the cloud platform 20 communicates with the OEM electronic device 41 and the vehicle owner's electronic device 42, such as a personal computer, a laptop, a smart phone and a tablet. The original equipment manufacturer can set and manage the vehicle owner's access authority. When the vehicle 30 is started, the main controller 10 operates and provides information to the vehicle owner for further application. The vehicle owner can implement business activities based on the information provided by the cloud platform 20. Under the after-sales service information in combination with food supply chain, residence supply chain, traffic supply chain and entertainment supply chain, the present invention can meet the vehicle owner's demands. In conclusion, the innovative service of the present invention can advance people's living standard, integrate various supply chains, and accomplish the purposes of environment protection and energy conservation.

What is claimed is:

1. A vehicle after-sales service system comprising:
   a main controller equipped on a vehicle and communicating with a Controller Area Network (CAN) bus system and an On-Board Diagnostics II (OBD-II) system of the vehicle to receive and transmit vehicle information including vehicle body information, chassis information, motive power information, entertainment information, and error information of the vehicle designated by an original equipment manufacturer (OEM);
   a cloud platform communicating with the main controller for data transmission, with the cloud platform receiving and storing the vehicle information from the main controller for providing to the original equipment manufacturer, wherein the OEM determines what after-sales service information including repair information and business activity information should be offered;
   wherein the cloud platform communicates with an original equipment manufacture (OEM) electronic device to send the vehicle information to the OEM electronic device; and
   wherein the vehicle information received by the main controller is stored in the cloud platform based on commands of the cloud platform.

2. The system as claimed in claim 1, wherein the cloud platform is a network server.

3. The system as claimed in claim 2, wherein the OEM electronic device is selected from a personal computer, a laptop, a smart phone, and a tablet.

4. The system as claimed in claim 2, wherein the vehicle is selected from a car, a scooter, a truck, and a container truck.

5. The system as claimed in claim 2, wherein the main controller and the cloud platform communicate with each other via third generation wireless networks.

6. The system as claimed in claim 2, wherein the main controller and the cloud platform communicate with each other via fourth generation wireless networks.

7. The system as claimed in claim 1, wherein the OEM electronic device is selected from a personal computer, a laptop, a smart phone, and a tablet.

8. The system as claimed in claim 1, wherein the vehicle is selected from a car, a scooter, a truck, and a container truck.

9. The system as claimed in claim 1, wherein the main controller and the cloud platform communicate with each other via third generation wireless networks.

10. The system as claimed in claim 1, wherein the main controller and the cloud platform communicate with each other via fourth generation wireless networks.

* * * * *